(12) United States Patent
Urban et al.

(10) Patent No.: US 7,493,988 B2
(45) Date of Patent: Feb. 24, 2009

(54) LUBRICATING TOOL FOR FEEDING A LUBRICATING MIXTURE TO A CUTTER

(75) Inventors: Markus Urban, Jork (DE); Joerg Malischewsky, Pfinztal (DE)

(73) Assignee: Airbus Deutschland GmbH, Hamburg (DE)

( * ) Notice: Subject to any disclaimer, the term of this patent is extended or adjusted under 35 U.S.C. 154(b) by 864 days.

(21) Appl. No.: 10/941,036

(22) Filed: Sep. 13, 2004

(65) Prior Publication Data

US 2005/0087560 A1    Apr. 28, 2005

(30) Foreign Application Priority Data

Sep. 11, 2003  (DE) ................. 103 41 919

(51) Int. Cl.
*B23Q 11/12* (2006.01)

(52) U.S. Cl. .................. 184/6.14; 184/6.26; 184/55.1; 184/55.2; 184/57

(58) Field of Classification Search ............... 184/50.1, 184/50.2, 51, 55.1, 55.2, 57, 6.14, 6.26; 409/135, 409/136, 137; 408/56, 57, 58, 59, 60, 61; 407/11; 222/251; 83/22; 144/364, 380; 451/449, 488

See application file for complete search history.

(56) References Cited

U.S. PATENT DOCUMENTS

| | | | |
|---|---|---|---|
| 3,693,757 A | 9/1972 | Callahan et al. | |
| 3,841,438 A | 10/1974 | Tine et al. | |
| 4,105,095 A | 8/1978 | Thrasher, Jr. | |
| 4,364,452 A | 12/1982 | Crago | |
| 4,472,111 A | 9/1984 | Yamatani | |
| 5,038,893 A | 8/1991 | Willner et al. | |
| 5,092,746 A | 3/1992 | Henke | |
| 5,961,299 A | 10/1999 | Gruett et al. | |
| 6,053,285 A | 4/2000 | Reeves | |
| 6,099,270 A | 8/2000 | Wech | |
| 6,702,199 B1 * | 3/2004 | Sugata et al. | ................. 239/128 |
| 6,783,309 B2 * | 8/2004 | Makiyama | ................... 409/136 |
| 6,832,620 B2 | 12/2004 | Jaeger | |

FOREIGN PATENT DOCUMENTS

| | | |
|---|---|---|
| DE | 4339770 | 5/1995 |
| WO | WO01/33133 | 5/2001 |

* cited by examiner

*Primary Examiner*—Robert A Siconolfi
*Assistant Examiner*—Vu Q Nguyen
(74) *Attorney, Agent, or Firm*—W. F. Fasse; W. G. Fasse

(57) ABSTRACT

A lubricating mixture of a lubricant and air is supplied to a cutting location by a lubricating tool with a spring biased piston dividing a cylinder into an air chamber and a lubricant chamber. The air chamber is connectable to a pressurized air source. The lubricant supply chamber is selectively connectable through a control valve to a lubricant source or to an exchangeable lubricant and air mixing attachment also connected to the pressurized air source. The attachment includes three flow restrictors. Two restrictors feed air and lubricant to a mixing area. One restrictor feeds the mixture to an output. Different sets of restrictors with different flow restricting characteristics provide an exact mixture dosage for satisfying any cutter lubricating requirement. It is merely necessary to replace one attachment by another attachment having different flow restricting characteristics.

12 Claims, 2 Drawing Sheets

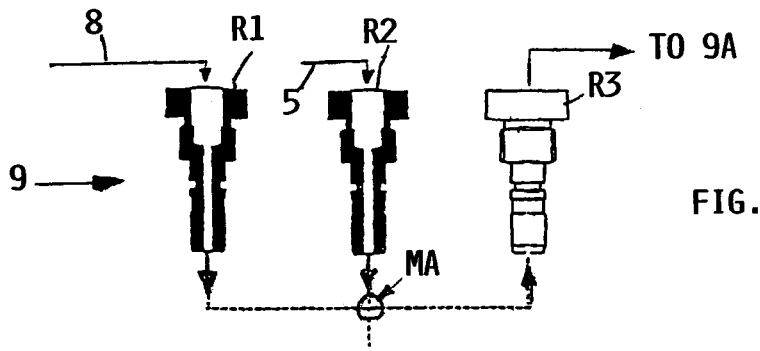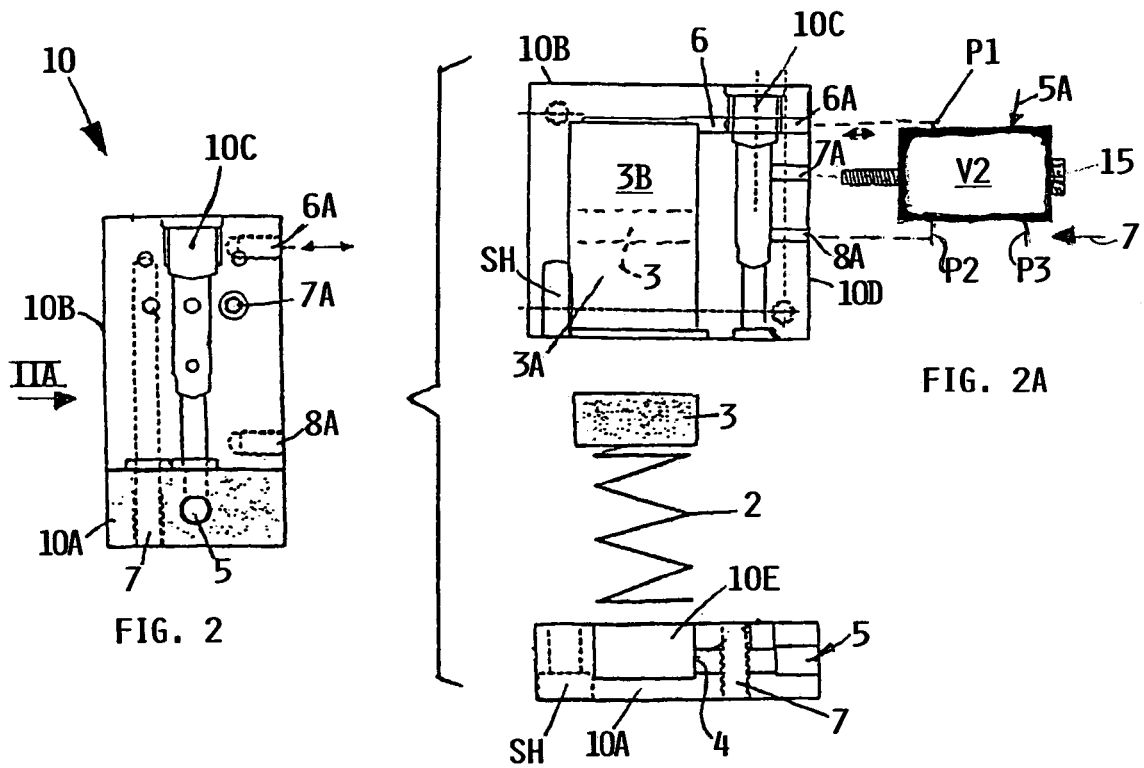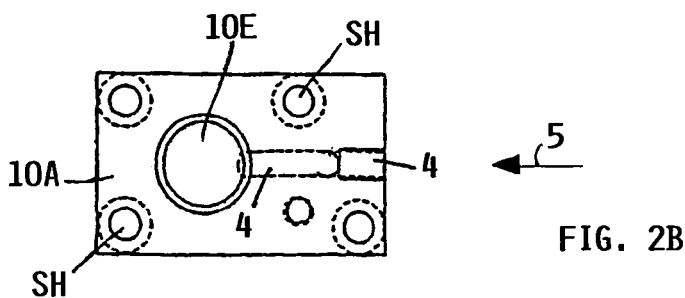

LUBRICATING TOOL FOR FEEDING A LUBRICATING MIXTURE TO A CUTTER

PRIORITY CLAIM

This application is based on and claims the priority under 35 U.S.C. §119 of German Patent Application 103 41 919.5, filed on Sep. 11, 2003, the entire disclosure of which is incorporated herein by reference.

FIELD OF THE INVENTION

The invention relates to supplying a lubricating mixture to a cutter of a power tool which is used to perform mechanical machining operations on metals and synthetic materials.

BACKGROUND INFORMATION

Such power tools are mobile, manually guided, pneumatically driven and require a supply of a lubricant to the cutter when the power tools are in operation. Such operations include, for example drilling, reaming, countersinking of bores, and the like. Such power tools comprise a mobile feed advance unit and are widely used in aircraft construction. The lubricant is primarily a mixture of lubricating oil and pressurized air. During operation the lubricating oil-air mixture is fed from a supply container to the cutting location where a cutter, such as a drill bit, a reamer or any other material removing tool engages a workpiece. The oil discharged from a supply container during operation of the tool is replenished when the power tool is not in operation.

German Patent Publication DE 43 39 770 A1 discloses a mobile precision drilling power tool that can be locked in a fixed position at a drilling location of large work pieces. The conventional power tool is constructed for precision drilling operations whereby a liquid lubricant is supplied all the way to the cutting tool edges. The known drilling power tool has a tool spindle carrying a chuck. The spindle is driven to rotate and for an axial feed advance of the spindle. The flow of lubricant passes through the spindle.

Conventional tools of the type described above have certain disadvantages or drawbacks such as an inadequate performance particularly when the lubricant supply system must also feed air to the cutting location. Another drawback is seen in that the dosing adjustment is inadequate so that either too much or too little lubricant is supplied to the cutting location. Moreover, the supply of lubricant takes place in cycles rather than continuously in response to constant process parameters. Further, conventional lubricating devices are constructed with a particular power tool or machine tool in mind and thus require an adaptation when a use for other power tools is intended. Frequently, such adaptation is not possible with regard to certain or even any power tools. Still another drawback of conventional lubricating tools is seen in that different drilling and friction conditions cannot be fully satisfied when a power tool is used in different operating positions such as horizontal and vertical drilling operations. Still another drawback is seen in that the lubricant reaches the cutting location only after a rather long reaction time following the activation of the lubricating tool.

OBJECTS OF THE INVENTION

In view of the foregoing it is the aim of the invention to achieve the following objects singly or in combination:
- to provide a compact lubricating device for power tools and machine tools, that is capable of feeding an optimal continuous lubricant supply directly to the cutting location and in accordance with any tool specific lubricating requirements;
- to make sure that the supplied volume or quantity of lubricant is a minimum quantity sufficient for lubricating all cutting edges currently in action;
- to provide the lubricating device with an exchangeable dosing attachment for precisely dosing the lubricant quantity or volume and any required air volume in response to any particular cutting operation requirements; and
- to provide a lubricating device for power tools that operates equally efficient in all operating position.

The invention further aims to avoid or overcome the disadvantages of the prior art, and to achieve additional advantages, as apparent from the present specification. The attainment of these objects is, however, not a required limitation of the present invention.

SUMMARY OF THE INVENTION

A lubricating tool according to the invention is suitable for supplying a lubricant and air as a lubricating mixture to a cutting location where a cutter engages a workpiece, said lubricating tool comprising a housing enclosing a hollow cylinder, a piston in said hollow cylinder dividing said hollow cylinder into an air pressure chamber and a lubricant supply chamber, a compression spring positioned in said air pressure chamber between said piston and said housing, an exchangeable lubricant and air mixing attachment also referred to as dosing or mixing attachment securable to said housing, a flow control valve connected to said housing, said flow control valve having a first port communicating with said lubricant supply chamber, a second port communicating with said exchangeable lubricant and air mixing attachment and a third port communicating with a lubricant source, said flow control valve further comprising a control input for switching said flow control valve between filling said lubricant supply chamber from said lubricant source and feeding lubricant from said lubricant supply chamber to said exchangeable lubricant and air mixing attachment, said lubricating tool further comprising a pressurized air conduit communicating said air pressure chamber and said exchangeable lubricant and air mixing attachment with a pressurized air source, said lubricating tool further comprising an output connected to said exchangeable lubricant and air mixing attachment for feeding said lubricating mixture to said cutting location.

Advantages of the invention are seen particularly in its compact, so to speak miniaturized, construction that incorporates a dosing and mixing device in the form of the exchangeable lubricant and air mixing attachment that produces an oil pressurized air lubricating mixture for cutting tools. The lubricant that can be handled by the present lubricating tool preferably has a low to medium viscosity within the range of 10 to about 50 mm$^2$/sec. Another advantage is seen in that the oil and pressurized air mixture can be dispensed with a linear or uniform oil feed advance rate, for example a linearly diminishing feed advance rate for optimizing the lubricant consumption and avoiding waste of lubricant. According to the invention such lubricant consumption depends not only on the type of lubricant used, but also on the exchangeable dosing and mixing attachment and on the flow resistance of the supply conduit between the present lubricating tool and the cutting location of a power tool. Another advantage is the possibility of exchanging the dosing and mixing attachment so that for example a constant dose of lubricant adapted to the requirements of any particular power tool cutter combination is supplied to the cutting location by a system of fixed flow control valves or flow restriction throttles also referred to as flow restrictors. More specifically, the mixing ratio of lubricating oil and pressurized air can be adapted to the particular known lubricating requirements by selecting the proper dosing attachment for any cutter.

A group of fixed flow restrictors is constructed as an insert for or an attachment to the lubricating tool housing, whereby different attachments will provide different dosing quantities or dosing ratios. Thus, the oil volume and the pressurized air volume are individually controlled independently of one another. Each different attachment has the same ports in the same positions for communicating with air and oil supply ports and channels in the lubricating tool housing. Yet another advantage of the lubricating tool according to the invention is seen in that a supply chamber for lubricant such as oil and air can be integrated into the lubricating tool which is thus self-sufficient and suitable for mobile use. Moreover, due to the position of the compression spring in the air supply chamber the force of this spring is effective on the piston in the cylinder housing, whereby the lubricant can be effectively supplied in any operating position of the lubricating tool because the spring force and the air pressure combine their action on the piston in the lubricating tool housing.

BRIEF DESCRIPTION OF THE DRAWINGS

In order that the invention may be clearly understood, it will now be described in connection with example embodiments thereof, with reference to the accompanying drawings, wherein:

FIG. 2 shows a view of the housing of the present lubricating tool with conduits or flow channels and a socket for the insertion of the attachment;

FIG. 2A shows an exploded view of the present lubricating tool with the housing seen in the direction of the arrow IIA in FIG. 2;

FIG. 2B shows a plan view of the bottom of the present lubricator; and

FIG. 2C shows a set of three flow restrictors which may have the same or different flow restriction characteristics and which form the exchangeable lubricant and air mixing insert or attachment.

Figure 1:
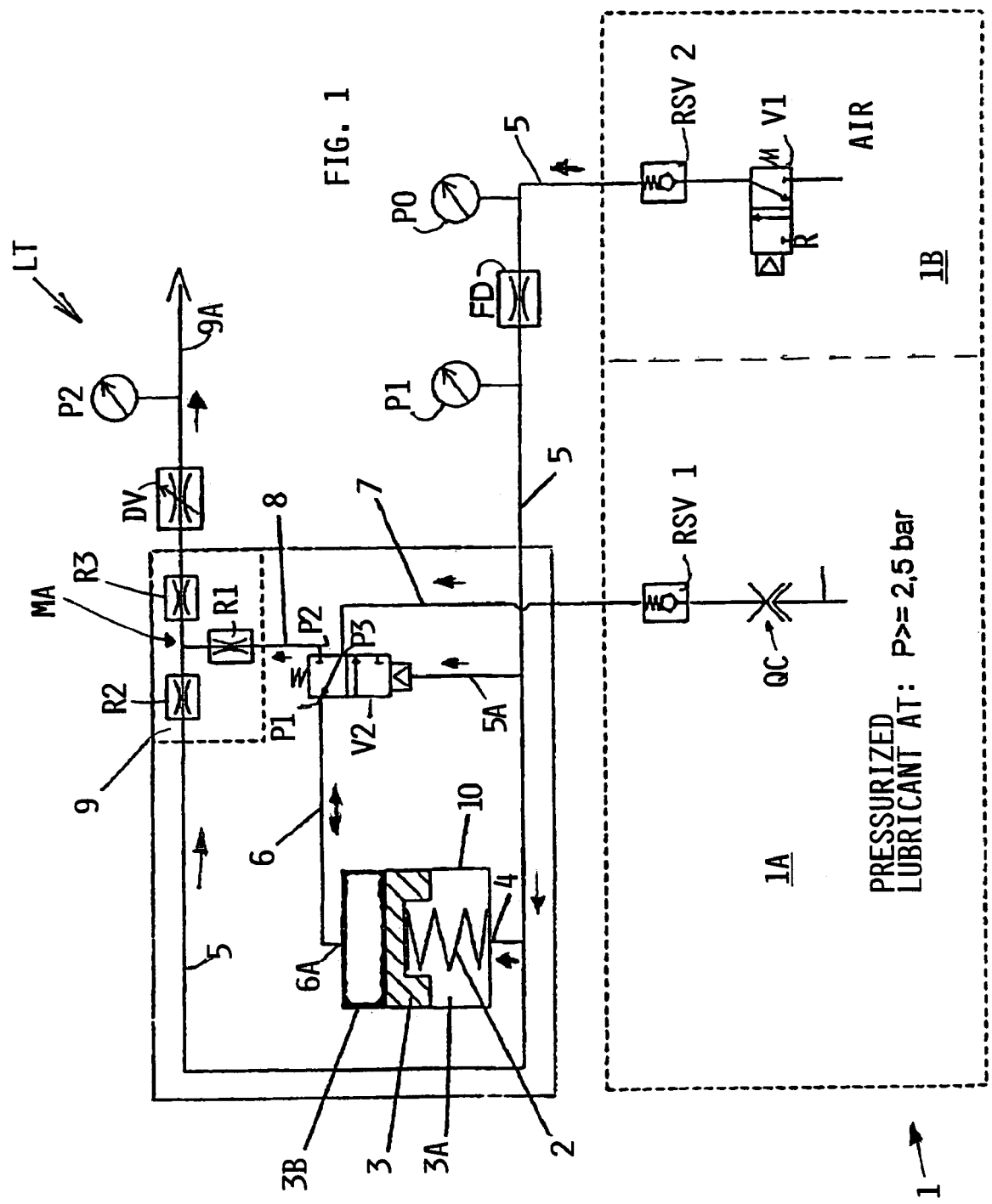
FIG. 1 shows symbolically a conduit circuit of the present lubricating tool including an exchangeable lubricant and air mixing insert or attachment with flow restriction throttles.

DETAILED DESCRIPTION OF A PREFERRED EXAMPLE EMBODIMENT AND OF THE BEST MODE OF THE INVENTION

FIG. 1 shows a conduit circuit with arrows indicating flow directions of the present lubricating tool LT. A supply tank 1 encloses a lubricant supply source 1A and a separate pressurized air source 1B. The lubricant source 1A may hold lubricating oil at a pressure P equal to or in excess of 2.5 bar. The lubricating tool LT is connected to the lubricant supply source 1A through a lubricant conduit 7, preferably connectable to the source 1A by a quick coupler QC and preferably through a check valve RSV 1 to prevent spilling and backflow. The tool LT is further connectable to the pressurized air source 1B through a control valve V1, through a check valve RSV 2 and through a flow restrictor FD connected in series in a pressurized air supply conduit 5. Pressure sensors P0 and P1 are preferably connected to the pressurized air conduit 5 upstream and downstream of the flow restrictor FD respectively. The restrictor FD limits the volume of pressurized air supplied to the lubricating tool LT, particularly to an exchangeable lubricant and air mixing attachment or insert 9 which also forms a dosing device to be described in more detail below.

The tool LT comprises a housing 10 enclosing a cylinder divided by a piston 3 into a first pressurized air chamber 3A and a second lubricant supply chamber 3B. A piston biasing compression spring 2 is arranged in the pressurized air chamber 3A which has an inlet port 4 connected to the pressurized air conduit 5 downstream of the restrictor FD. Thus, the force or pressure exerted on the piston 3 is the sum of the force exerted by the compression spring 2 and the force or pressure provided by the pressurized air in the conduit 5.

The lubricant supply chamber 3B communicates through a channel 6 and a port 6A in the housing 10 and through the flow control valve V2 with the lubricant supply conduit 7 or with the exchangeable attachment 9. For this purpose the flow control valve V2 has three ports P1, P2, P3. A first port P1 is connected to the housing port 6A when the valve V2 is secured to the housing 10. The lubricant supply chamber 3B receives lubricant through channel 6 and port 6A when the valve ports P1 and P3 communicate with each other as shown in FIG. 1. The second valve port P2 communicates with the exchangeable lubricant and air mixing attachment 9 through a channel 8 and a port 8A. When the tool LT is operated for lubricating, the valve ports P1 and P2 communicate with each other and lubricant is supplied from the chamber 3B to the restrictor R1.

The check valve RSV 2 prevents a backflow of pressurized air into the air source 1B, just as the check valve RSV 1 prevents a backflow of lubricant into the lubricant source 1A. Thus, an uncontrolled outflow of lubricant from the lubricant supply chamber 3B and an outflow of air from the conduit 5 are prevented when that chamber 3B is completely filled with lubricant such as oil and the tool is not used actively for lubricating and is decoupled by the quick coupler QC from the lubricant source 1A.

Referring to FIGS. 2, 2A, 2B and 2C in conjunction, the exchangeable lubricant and air mixing attachment 9 of the invention is connectable to or insertible into a socket 10C in the housing 10. The attachment 9 comprises three flow restrictors or throttles R1, R2 and R3 as seen in FIG. 2C. The throttle R1 is connected through a conduit or channel 8 and port 8A of the tool housing 10 to the port P2 of the flow control valve V2 for supplying lubricant to a mixing area MA. The restrictor R2 is connected to the pressurized air conduit 5 and supplies pressurized air to the mixing area MA. The restrictor R3 receives a lubricating mixture from the mixing area MA and feeds the lubricating mixture, preferably through a controllable restrictor DV, to an output 9A for feeding lubricating mixture to a cutting location where a cutter engages a workpiece not shown. Preferably a pressure sensor and indicator P2 is connected to the output 9A.

The throttling or flow restrictors R1, R2 and R3 are preferably fixed restrictors having a predetermined flow restricting characteristic. According to the invention, exchanging a set of restrictors R1, R2, R3 having a predetermined flow restricting characteristic by any set of a plurality of restrictor sets having different flow restricting characteristics, makes it possible to supply a lubricating mixture that is tailored to an exact mixing ratio, to the output 9A in compliance with any cutting tool lubricating requirements. The output 9A is preferably connected to or communicating with a cooling channel or channels of the cutter in a power tool or machine tool or mobile portable cutting tool not shown.

FIG. 2 shows a view of the housing 10 including conduits or flow channels machined in the housing 10 and leading to respective ports. The housing 10 has a first housing section 10A and a second housing section 10B connected to the first housing section 10A by screws in screw holes SH. The second housing section 10B is provided with a mounting such as a socket 10C for the exchangeable insertion or attachment of a restrictor set 9 shown in FIG. 2C. The housing 10 further comprises a port 6A leading to the port P1 of the valve V2 when the valve V2 is secured to a sidewall 10D of the second housing section 10B for example by screws 15.

Referring to FIG. 2A, showing an exploded view of the housing 10 and its components, the first and second housing sections 10A, 10B are provided with screw holes SH for interconnecting the two housing sections 10A and 10B. The inlet port 4 of the air chamber 3A is connected to the pressurized air supply conduit 5. The housing port 6A communicates with valve port P1 of the flow control valve V2. A housing port 7A communicates with valve port P3. A housing port 8A communicates with the valve port P2 of the valve V2. As mentioned, using different exchangeable lubricant and air mixing attachments or inserts 9 with different restrictors R1, R2, R3 different dosing ratios are achieved. Further, each restrictor R1, R2, R3 may have the same restricting characteristic or different restricting characteristics to achieve the desired lubricant and air mixing volumes and/or mixing ratios and dosing quantities.

In operation in response to a trigger signal at the control input 5A the flow control valve V2 switches from the filling flow passage shown in FIG. 1 for the lubricant such as oil to a discharge flow passage from the chamber 3B to the restrictor R1 through the valve V2, whereby the valve ports P1 and P2 communicate with each other. If the tool LT is switched off, the chamber 3B is connected through the ports P1 and P3 of the valve V2 to the supply conduit 7 and thus to the lubricant supply source 1A whereby the lubricant is automatically replenished in the chamber 3B for the next lubricating operation. The control input 5A of the valve V2 is preferably connected to the pressurized air conduit 5, whereby the valve V2 can be switched from the one position to the other position and vice versa by a pneumatic trigger signal. However, other valve trigger signals are possible, for example a mechanical or electrical switch over is possible. As shown in FIG. 1, the ports P1 and P3 of the valve V2 are interconnected, whereby the lubricant is automatically supplied into the chamber 3B.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A lubricating tool for supplying a lubricant and air as a lubricating mixture to a cutting location where a cutter engages a workpiece, said lubricating tool comprising a housing (10) enclosing a hollow cylinder, a piston (3) in said hollow cylinder dividing said hollow cylinder into an air pressure chamber (3A) and a lubricant supply chamber (3B), a compression spring (2) positioned in said air pressure chamber (3A) between said piston (3) and said housing (10), an exchangeable lubricant and air mixing attachment (9) securable to said housing (10), a flow control valve (V2) connected to said housing (10), said flow control valve (V2) having a first port communicating with said lubricant supply chamber (3B), a second port communicating with said exchangeable lubricant and air mixing attachment (9) and a third port communicating with a lubricant source (1A), said flow control valve (V2) further comprising a control input for switching said flow control valve between filling said lubricant supply chamber (3B) from said lubricant source (1A) and feeding lubricant from said lubricant supply chamber (3B) to said exchangeable lubricant and air mixing attachment (9), said lubricating tool further comprising a pressurized air conduit (5) communicating said air pressure chamber (3A) and said exchangeable lubricant and air mixing attachment (9) with a pressurized air source (1B), said lubricating tool further comprising an output (9A) connected to said exchangeable lubricant and air mixing attachment for feeding said lubricating mixture to said cutting location in response to operating said flow control valve (V2).

2. The lubricating tool of claim 1, wherein said control input of said flow control valve (V2) is connected to said pressurized air conduit (5) for switching said flow control valve (V2) between a position for filling said lubricant supply chamber (3B) and a position for feeding lubricant from said lubricant supply chamber (3B) to said exchangeable lubricant and air mixing attachment (9).

3. The lubricating tool of claim 1, wherein said flow control valve (V2) is a controllable three-port-two-way valve.

4. The lubricating tool of claim 1, wherein said housing(10) comprises a first housing section (10A) and a second housing section (10B), said second housing section (10B) having said lubricant supply chamber (3B) and a first port (6A) that communicates said lubricant supply chamber (3B) with said lubricant source (1A) through said flow control valve (V2), said first housing section (10A)having said air pressure chamber (3A) and a second port (4) that communicates said air pressure chamber (3A) through said pressurized air conduit (5) with said pressurized air source (1B),and said second housing section (10B) further having a socket for insertion of said exchangeable lubricant and air mixing attachment (9), and a mounting for connecting said flow control valve (V2) to said housing (10).

5. The lubricating tool of claim 4, wherein said mounting is positioned in a side wall of said second housing section for securing said flow control valve (V2) to said side wall.

6. The lubricating tool of claim 1, wherein said compression spring (2) exerts a first pressure on said piston (3), said pressurized air exerting a second pressure on said piston (3), and wherein a feeding pressure for feeding lubricant from said lubricant supply chamber (3B) through said flow control valve (V2) corresponds to the sum of said first and second pressures.

7. The lubricating tool of claim 1, wherein said exchangeable lubricant and air mixing attachment (9) comprises a first flow restrictor (R1) communicating with said second port of said flow control valve (V2) for feeding lubricant to a mixing area (MA), a second flow restrictor (R2) communicating with said pressurized air conduit (5) for feeding air to said mixing area (MA), and a third flow restrictor (R3) for feeding said lubricating mixture to said output (9A).

8. The lubricating tool of claim 7, wherein said first, second and third flow restrictors each have a predetermined fixed flow restricting or throttling characteristic for dosing lubricant and air to said mixing area (MA), and for dosing lubricating mixture from said mixing area (MA) to said output (9A).

9. The lubricating tool of claim 7, further comprising a variable flow restricting valve (DV) between said output (9A) and said third flow restrictor (R3).

10. The lubricating tool of claim 1, wherein said pressurized air conduit (5) comprises a control valve (V1) a check valve (RSV 2) and a flow restrictor (FD) connected in series with one another and leading to said pressurized air source (1B).

11. The lubricating tool of claim 1, further comprising a lubricant conduit (7) between said third port of said flow control valve (V2) and said lubricant source (1A), and a check valve (RSV 1) in said lubricant conduit.

12. The lubricating tool of claim 11, further comprising a quick-coupler (QC)between said lubricant source (1A) and said check valve(RSV 1) in said lubricant conduit (7).

* * * * *